United States Patent
Billington et al.

(10) Patent No.: US 10,235,848 B2
(45) Date of Patent: Mar. 19, 2019

(54) PUBLIC NETWORK TRANSMISSION OF HAPTIC EFFECT SIGNALS

(71) Applicant: IMMERSION CORPORATION, San Jose, CA (US)

(72) Inventors: Douglas G. Billington, San Jose, CA (US); Robert A. Lacroix, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 14/964,058

(22) Filed: Dec. 9, 2015

(65) Prior Publication Data

US 2017/0169673 A1    Jun. 15, 2017

(51) Int. Cl.
| | |
|---|---|
| G08B 6/00 | (2006.01) |
| H04W 4/06 | (2009.01) |
| G06F 3/01 | (2006.01) |
| H04W 4/04 | (2009.01) |
| H04W 4/20 | (2018.01) |

(52) U.S. Cl.
CPC ............ *G08B 6/00* (2013.01); *G06F 3/011* (2013.01); *G06F 3/016* (2013.01); *H04W 4/046* (2013.01); *H04W 4/06* (2013.01); *H04W 4/20* (2013.01)

(58) Field of Classification Search
None
See application file for complete search history.

(56) References Cited

U.S. PATENT DOCUMENTS

| | | | | |
|---|---|---|---|---|
| 8,552,847 | B1* | 10/2013 | Hill | ............................ 340/407.1 |
| 9,304,588 | B2* | 4/2016 | Aldossary | ..................... 434/112 |
| 2005/0171664 | A1* | 8/2005 | Konig | .................... G10L 15/22 |
| | | | | 701/36 |
| 2008/0153554 | A1 | 6/2008 | Yoon et al. | |
| 2008/0298356 | A1* | 12/2008 | Deng | ....................... H04B 7/12 |
| | | | | 370/389 |
| 2009/0239557 | A1* | 9/2009 | Kadakia | ................ H04H 20/34 |
| | | | | 455/466 |
| 2010/0188265 | A1 | 7/2010 | Hill et al. | |
| 2010/0285784 | A1 | 11/2010 | Seo et al. | |

FOREIGN PATENT DOCUMENTS

EP    2846229    3/2015

OTHER PUBLICATIONS

Extended European Search Report, EP application No. 16202207.3-1870, dated Mar. 8, 2017, 8 pages.

\* cited by examiner

*Primary Examiner* — Brent Swarthout
(74) *Attorney, Agent, or Firm* — Miles & Stockbridge P.C.

(57) ABSTRACT

An apparatus for receiving public broadcasts and haptic effects comprises a receiver having at least first and second communication channels, the first channel configured to receive a wireless transmission of a non-haptic signal, and the second channel configured to receive a wireless transmission of a haptic signal. A transducer is in electrical communication with the receiver, the transducer being configured to receive and present the public message broadcast through the first channel. A haptic effect actuator in electrical communication with the receiver, the haptic actuator responsive to the haptic signal to generate a haptic effect.

26 Claims, 6 Drawing Sheets

FIG. 1A
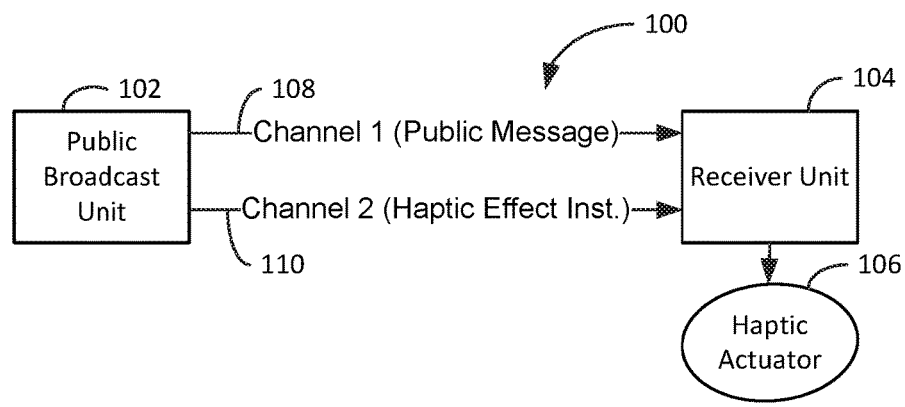
FIG. 1B
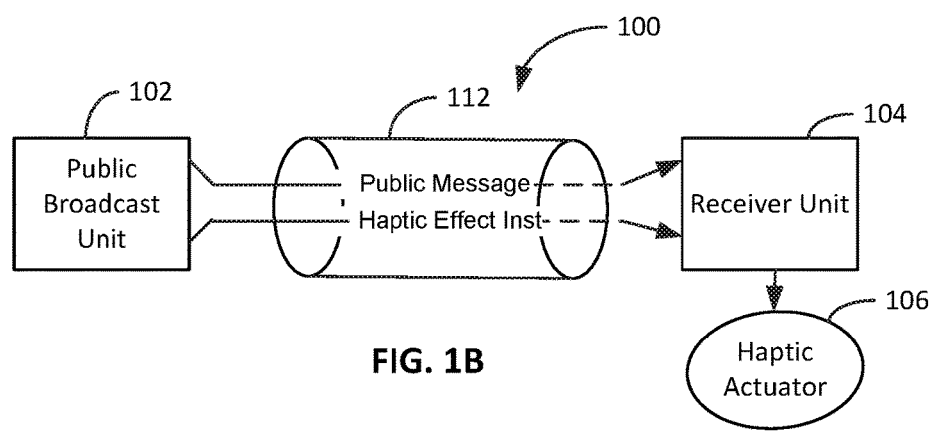
FIG. 1B

US 10,235,848 B2

PUBLIC NETWORK TRANSMISSION OF HAPTIC EFFECT SIGNALS

TECHNICAL FIELD

This patent document relates to the transmission of haptic effects, and, more particularly, to the transmission of haptic effects over a public communication network.

BACKGROUND

Public messaging systems can provide valuable information to the general public. Such messaging might convey emergency information to which the public should pay direct and prompt attention. Other messaging might provide information which the general public might choose to act on or ignore, such as which roads carry lighter traffic at certain times of the day. Still other messaging might provide general information, for example, interesting information on a local landmark, which may or may not be of interest to the average recipient.

SUMMARY

In general terms, this patent document is directed to broadcast of messages and haptic effects over separate channels in a public communication network.

In one aspect, an apparatus for receiving public broadcasts and haptic effects comprises a receiver having at least first and second communication channels, the first channel configured to receive a wireless transmission of a non-haptic signal, and the second channel configured to receive a wireless transmission of a haptic signal. A transducer is in electrical communication with the receiver, the transducer being configured to receive and present the public message broadcast through the first channel. A haptic effect actuator in electrical communication with the receiver, the haptic actuator responsive to the haptic signal to generate a haptic effect.

In another aspect, an apparatus for transmitting haptic data over a channel on a public communication network comprises a multiple-channel wireless transmitter. A processor is communicatively coupled to the multiple-channel wireless transmitter, wherein the processor is configured to operate in response to an input trigger to select a public message and haptic data, wherein multiple-channel wireless transmitter is configured to transmit the selected public message over a first wireless channel of the multiple channels and is configured to transmit the haptic data over the second wireless channel of the multiple channels.

In another aspect, a method delivers haptic effect data over a public network. The method comprises transmitting a non-haptic signal over a first wireless communication channel, the non-haptic signal embodying a public message; and transmitting a haptic signal over a second wireless communication channel, the haptic signal embodying a set of haptic data associated with the public message.

BRIEF DESCRIPTION OF THE DRAWINGS

FIG. 1A is a schematic of a system for wireless transmission of public messages with haptic effects using a multiple channel transmission scheme according to various embodiments of this patent document.

FIG. 1B is a schematic of a system for wireless transmission of public messages with haptic effects using a sub-channel of logical channel transmission scheme according to various embodiments of this patent document.

DETAILED DESCRIPTION

Figure 2:
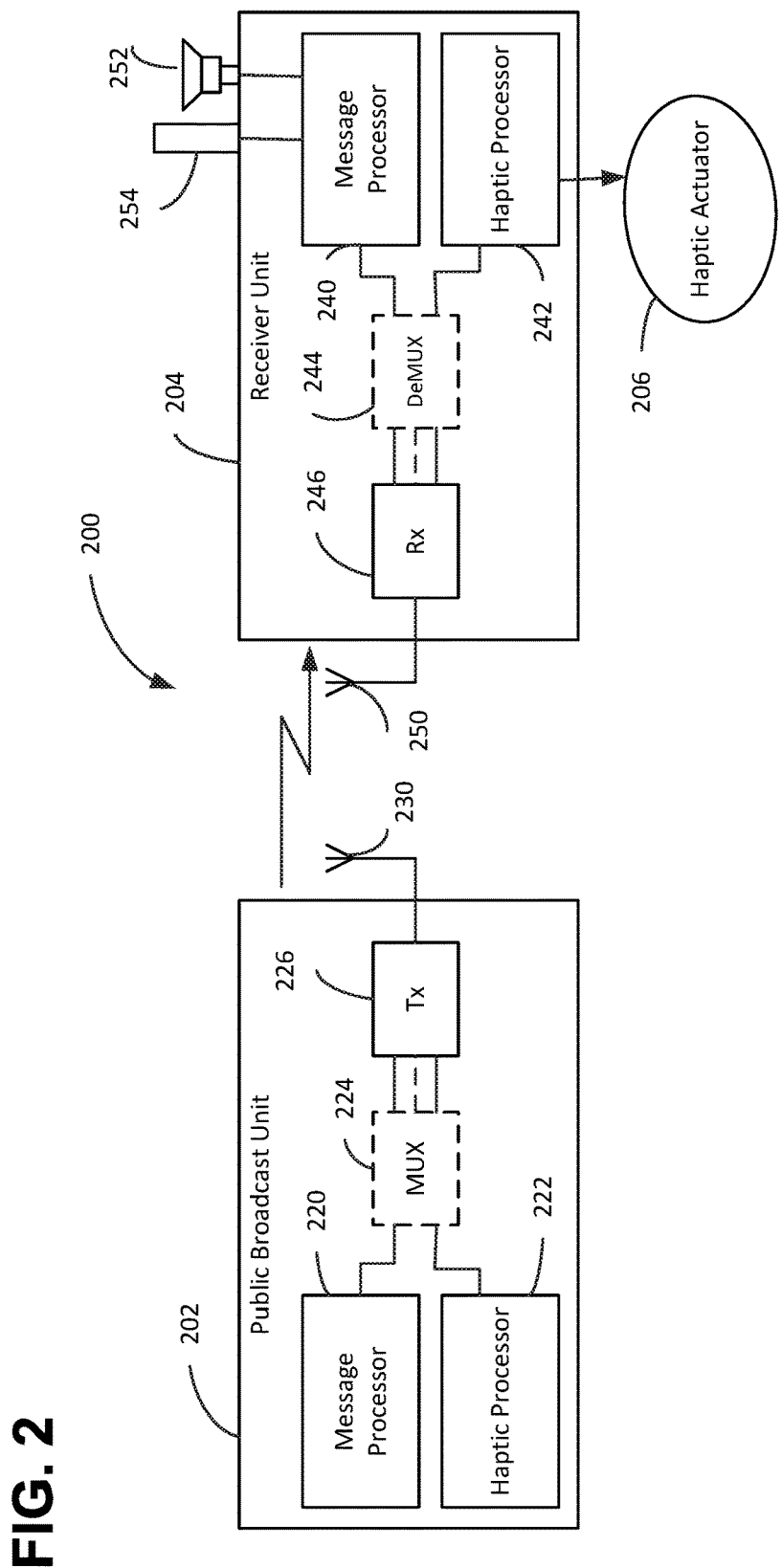
FIG. 2 is a schematic illustrating the basic components of a public broadcast unit and a receiver unit according to various embodiments of this patent document.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

Systems, apparatuses, and methods for the transmission of signals related to public information and haptic effects are disclosed herein. The non-haptic public information signals and the haptic signals can be transmitted over separate channels in a public communication network. In various embodiments, a public communication network comprises a signal transmission system for transmitting signals provided wholly or mainly for the purpose of communication to members of the public. The transmission system can include the apparatuses, software, data, and transmission frequencies used for communication. Frequencies commonly used for public communication networks include frequencies in the VHF and UHF public service and safety bands, emergency bands, marine bands, weather bands, and public service bands. Yet other examples of frequencies in a public communication network include frequencies in the DSRC spectrum (dedicated short range communications; 5850-5925 MHz), which are used for vehicle-to-vehicle (V2V) and vehicle-to-infrastructure (V2I) communication systems; and frequencies used for FasTrak (915 MHz) for electronic toll collection and other toll collection systems. In some embodiments, the public communication network comprises broadcast frequencies reserved for governmental or quasi-governmental entities including federal, state, national or local governments, agencies, and commissions. In other embodiments, the broadcast frequencies are used or owned by private entities.

The public communication networks can be used to transmit non-haptic signals carrying any type of non-haptic information such as messages or other types of data.

Examples include messages conveying information about traffic, tolls, weather, tourism, events, public safety and emergencies, and Amber alerts. Other examples include data or even signals to remotely control apparatuses such as automobiles, planes, boats, and other types of vehicles and apparatuses. Such non-haptic signals can carry any type of non-haptic information, which can have a variety of different forms such as voice, video, or text.

As disclosed herein, the public communication network also can be used for the transmission of signals related to haptic effects, which are tactile sensations delivered to a person. The haptic effect typically embodies a message such as a cue, notification, or more complex information. Such haptic signals can contain any type of haptic data such as instructions to deliver or initiate delivery of a haptic effect, data defining a haptic effect to deliver, or a message to be delivered through a haptic effect. The transmission also could contain an analog signal that is received, processed, and used to control an actuator that creates the haptic effect. Examples of haptic effects include forces such as forced feedback, vibrations, and motions.

Haptic signals can be transmitted over one or more channels different than the channels used to transmit non-haptic signals. Additionally, the channels can be any type of pathway for the transmission of data or signals and can include a primary channel such as a bandwidth of frequencies, sub-channels within a primary channel, or logical channels or logical sub-channels such as separate segments of a carrier signal. Accordingly, the term "channels" can refer to a channel, sub-channel, or logical channel.

Additionally, in various embodiments, the public communication network can be configured to be city-wide, state-wide, nation-wide, global, or in any other defined geographical area. Accordingly, the haptic effects and other information can be transmitted over a public communication network in a defined area.

The delivery of both a public message and a haptic effect can have multiple uses. Additionally, haptic data transmitted on one or more channels can be related to or coordinated with the non-haptic information transmitted over one or more different channels. Alternatively, the haptic data can be independent of or unrelated to any non-haptic information transmitted over other channels.

In some example applications, haptic effects can be of use in the automotive market where public networks such as FasTrak, V2V, and V2I are already being used. In the instance of FasTrak, a public data network exists that includes transceivers inside customer vehicles. A haptic effect can be added to the existing toll charging digital track to send traffic updates and alerts to motorists in real time. A public message and haptic effect advises the driver or vehicle occupants of a real-time traffic alert based on where the vehicle is located or where it is headed. The haptic effect may be delivered to electronic devices of the vehicle occupants or to the vehicle itself. This particular use of a message and haptic effect helps drivers to avoid hazards, accidents, traffic slowdowns, etc. Another exemplary use includes collecting localized traffic speed information from road sensors, haptically enhancing the information and selectively delivering the enhanced information to the motorist.

Haptic effects may also be used in cooperation with public messaging such that a motorist can program an alert request whenever the motorist approaches a certain type of destination such as a restaurant, gas station, or any other predetermined destination. Examples of the haptic effects might include vibrating the motorist's seat, steering wheel, or other structure on the vehicle. Haptic effects additionally may be used with emergency safety alerts; a driver heading towards a multi-car accident may be sent a visual, audio and haptic warning to stop or slow down to provide sufficient time to avoid the incident. Audio and visual alerts may be missed by a motorist, but a haptic warning is likely felt and recognized almost immediately helping to ensure road safety.

The haptic alerts in automotive applications can be established as local alerts broadcasting to vehicles within a certain range of a transmitter. Any type of traffic update, status or alert can be local and selective (by the broadcaster or receiver) by using software applications to select the types of alerts to be delivered and the types of haptic effects to accompany those alerts.

In the instance of a V2V or V2I network, a haptic effect can, for example, comprise a component of the communication. The haptic effect encoding in the communication signal can be arbitrary in that it can be a direct encoding (e.g., control signal, high bandwidth, "apply this signal to the seat actuators"), an indexed encoding (e.g., "play haptic effect FX1", where the haptic effect FX1 is stored and reproduced locally within the car), or a referential coding (e.g., "Play the 'Accident Ahead' warning beacon in the car, which may include a multi-media communication that includes a haptic component). In another referential encoding example, a generic traffic/road condition message from an external source (e.g., another vehicle ahead, local road construction beacon, radio tower) is properly interpreted (e.g., in the car) to provide the proper haptic effect that is best suited to the condition and the haptic abilities of the vehicle.

Although examples of transmissions related to haptic effects to automobiles are provided, the transmission of haptic effects over a channel on a public communication network may have applications other than automobiles and transportation.

Example embodiments of a system 100 for wireless transmission of public messages with haptic effects are illustrated in FIGS. 1A and 1B. FIG. 1A depicts the system 100 as including a public broadcast unit 102, a receiver unit 104 (residing within or coupled to a publicly available electronic device), and a haptic actuator 106. FIG. 1A further depicts a multi-channel transmission from the broadcast unit 102 to the receiving unit 104, with a first wireless channel 108 carrying the non-haptic signal and the second channel 110 carrying the haptic signal. In one example embodiment, the non-haptic signal and the haptic signal are transmitted substantially simultaneously over the separate channels while in an alternative embodiment, the timing for the transmission of the non-haptic and haptic signals are staggered, e.g., the non-haptic signal is transmitted over the first channel 108 before or after the haptic signal is transmitted over the second channel 110. The separate channels 108 and 110 may be next to each other within a frequency range or may be separated by other channels in the frequency range. Further, the channels 108 and 110 may be of the same or different bandwidths.

FIG. 1B similarly depicts the system 100 as including a public broadcast unit 102, a receiver unit 104, and a haptic actuator 106. However, in this example embodiment, the non-haptic signal and the haptic signal are placed into sub-channels or logical channels for transmission to a receiver. The sub-channels or logical channels are typically carried by a single signal 112 through techniques such as modulation.

FIG. 2 provides another example embodiment of a system for public broadcast with haptic effects. The system 200 includes a public broadcast unit 202, a receiver unit 204 and a haptic actuator 206. As illustrated, the public broadcast unit 202 includes a message processor 220, a haptic processor 222, an optional multiplexor 224, and a wireless transmitter 226 (or transceiver) coupled to an antenna 230. The message processor 220 is configured to execute programmed instructions to generate an output that is representative of a desired public message. The desired public message comprises a non-haptic signal in an audio, video or text format. The haptic processor 222 is configured to execute programmed instructions to generate an output that is representative of an instruction to produce a haptic effect that is broadcast before, after or during the broadcast of the public message. Note, that while the message processor 220 and haptic processor 222 have been identified in the figure as two separate elements, a single processor may be configured to perform both functions.

In an example embodiment, the outputs of the message processor 220 and the haptic processor 224 are input to the transmitter 226. In this embodiment, the transmitter 226, is configured to transmit, via antenna 230, the non-haptic signal and the haptic signal over separate wireless channels, as described above with reference to FIG. 1A.

In another example embodiment, the outputs of the message processor 220 and the haptic processor 224 are input to the multiplexer (MUX) 224, which operates to place the non-haptic signal and the haptic signal into sub-channels or logical channels to be transmitted on a signal carrier. For example, if frequency division multiplexing is used, the MUX 224 places the non-haptic and haptic signals onto separate carrier signals, each carrier signal having a separate frequency range within the bandwidth of the public transmission. Each carrier signal is in a separate sub-channel. In another example, if time division multiplexing is used, the MUX 224 inserts the non-haptic public signal and the haptic signal into separate time slots of a carrier signal. The separate time segments form separate logical channels that carry different signals. Other possible embodiment can use other multiplexing techniques. The multiplexed non-haptic signal and haptic signal are input as a multi-channel signal to the transmitter 226. In this embodiment, the transmitter 226 is configured to then transmit, via the antenna 230, the multi-channel, multiplexed public message/haptic instruction signal as described above with reference to FIG. 1B.

In yet another example, data encoding the public message and haptic data are in separate data packets such that the data packets carrying the public message form a logical channel and the data packets carrying the haptic data form a separate logical channel. The public message and haptic message also can be included in a single data packet with the public message being in one portion of the data packet that forms one logical channel and the haptic message being in a different portion of the data packet that forms a different logical channel. In these embodiments, the data packets will have a header that identifies whether the payload for the packet is data for the public message or haptic data so that the receiver can processes the data packets accordingly. The packet header also can include other information such as the packet length and addresses. The use of addresses can enable the system to deliver public messages and haptic data to select receivers. In use, the data packets are typically modulated onto a carrier wave 112 that is then transmitted by the transmitter 226.

The receiver unit 204 similarly includes a message processor 240, a haptic processor 242, as well as an optional demultiplexer 244 and a wireless receiver 246 (or transceiver) coupled to an antenna 250. The wireless receiver 246 is configured to receive, via antenna 250, the transmission from the public broadcast unit 202. Upon the wireless receiver 246 receiving the non-haptic signal and the haptic signal over separate wireless channels, as described above with reference to FIG. 1A, the receiver 246 is configured to input the received non-haptic signal to the message processor 240 and the received haptic signal to the haptic processor 242. Alternatively, upon the receiver 246 receiving the multiplexed, multi-channel non-haptic signal/haptic signal over a wireless channel, as described above with reference to FIG. 1B, the received transmission is input to the demultiplexer 244 which operates to separate the combined transmission into its public message and haptic effect components for input to the message processor 240 and the haptic processor 242, respectively.

The message processor 240 of the receiver unit 204 is configured to execute programmed instructions in response to the received non-haptic signal and produce a corresponding audio, video or text public message; the audio public message may be delivered through a public message delivery device, for example, through a speaker 252 of a publicly available electronic device, while the video or text public message may be delivered, for example, to a display screen 254 of a publicly available electronic device. The haptic processor 242 of the receiver unit 204 is configured to execute programmed instructions in response to the received haptic instruction and produce a corresponding haptic effect through appropriate activation of one or more haptic actuators 206 within or coupled to a publicly available electronic device. Note, that while the message processor 240 and haptic processor 242 have been identified in the figure as two separate elements, a single processor may be configured to perform both functions.

Figure 3:
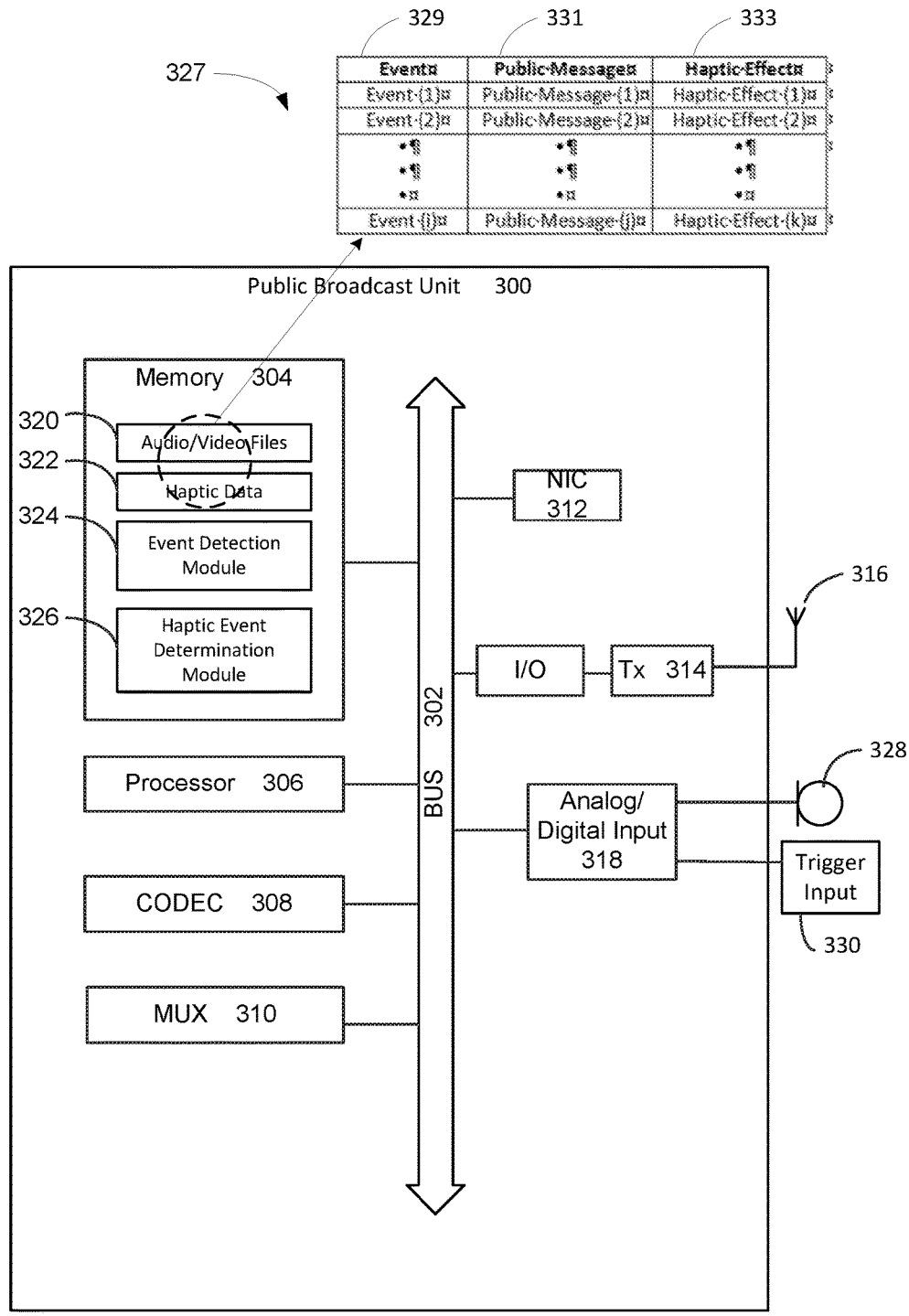
FIG. 3 is a schematic of the public broadcast unit according to various embodiments of this patent document.

FIG. 3 provides still another example embodiment of a public broadcast unit of a system for public broadcast with haptic effects. The public broadcast unit 300 of FIG. 3 includes a main transmission path created by bus 302 to which is coupled a memory 304, a processor 306, a coder/decoder (CODEC) 308, a multiplexer (MUX) 310, a network interface card (NIC) 312, a wireless transceiver 314 with antenna 316, and an analog and/or digital input interface 318 to receive inputs from, for example, a microphone, a digital audio track, digital video data, analog or digital sensor, push button, selector switch, etc.

The memory 304 may comprise non-volatile memory and RAM (random access memory), and is configured to store program instructions and data upon which the processor 306 is configured to execute. The contents of the memory 304 includes, among various other types of content, audio and/or video files 320, haptic data 322, a processor-executable event detection module 324 and a processor-executable haptic event determination module 326.

The audio and video files 320 comprise audio (e.g., which may be recorded or provided via a real-time feed through a microphone 328), video or text public messages whereby the processor 306 selects the appropriate public message for transmission in response to the event detection module 324 detecting a public message event. The detection of a public message event is realized by the event detection module 324 identifying various possible trigger inputs, e.g., such as those from sensors, manual entries, voice entries, push-button actuations, selector switch actuations, etc., that have been received through the transceiver 314, whose wireless network access is enabled by the NIC 312, or through the input interface 318.

Upon the detection of a public message event, the event detection module 324 not only operates in conjunction with the processor 306 to retrieve the appropriate public message audio, video or text file 320, it additionally operates in conjunction with the haptic event determination module 326 to determine what type or types of haptic events are related to the selected public message. See, for example, the database 327 configuration wherein a public message event 329 corresponds to a public message 331 and the public message 331 corresponds to haptic event data 333; other organizational structures may be used without departing from the spirit or scope of this patent document. Once the haptic event determination module 326 has selected the type of haptic event to accompany the public message, the haptic event determination module accesses the haptic data 322 to obtain the instruction(s) needed to elicit the desired haptic effect.

The selected non-haptic signal and selected haptic signal are then wirelessly transmitted by the transceiver 314 over separate wireless channels, as described earlier with respect to FIG. 1A, or the message and haptic instructions are placed into separate sub-channels or logical channels by the MUX 310 for transmission, as described herein. The CODEC 308 is provided to compress the selected public message and haptic instructions prior to transmission by the transceiver 314.

The analog and/or digital input interface 318 may be multi-purpose or dedicated purpose as appropriate. In one example embodiment, the input interface 318 enables direct entry of a trigger input for event detection. In another example embodiment, the input interface enables the input of audio or video public message data for live-feed, real-time messages or storage in memory 304.

The public broadcast unit 300 has been described as an exemplary embodiment, however, it should be noted that the overall configuration of the public broadcast unit 300 can be modified to suit a particular application or situation. For example, the event detection module 324 might be eliminated as unnecessary in a configuration where any activation of the public broadcast unit 300 is a trigger event to immediately transmit a pre-determined public message or transmit a live-feed message, e.g., there is no need to identify which public message should be transmitted. Similarly, the haptic event determination module 326 might be eliminated as unnecessary in a configuration where any activation of the public broadcast unit 300 is a trigger event to immediately transmit a pre-determined haptic signal. Alternatively, one or both of the event detection module 324 and haptic event determination module 326 may be used but not located in the public broadcast unit 300; rather, modules 324 and 326 may be located in a remote location (e.g., in a remote server or in the receiver unit) for remote access by the public broadcast unit. Likewise, the audio/video files 320 or the haptic data 322 may be housed remotely, in a remote server at the receiver unit. Further, the CODEC 308 used to compress a signal prior to transmission may not be necessary if compression is not needed or desired. The MUX 310 may not be included if multiplexing of the non-haptic signal and the haptic signal is not necessary. The analog/digital interface 318 may not be necessary if inputs to the broadcast unit are not necessary or desired, for example, in a configuration where the powering up of the public broadcast unit is the only trigger input needed to activate transmission of the non-haptic signal and the haptic signal. Other variations on the inclusion or omission of the various components of the public broadcast unit 300 may be utilized without departing from the spirit or scope of this patent document.

Figure 4:
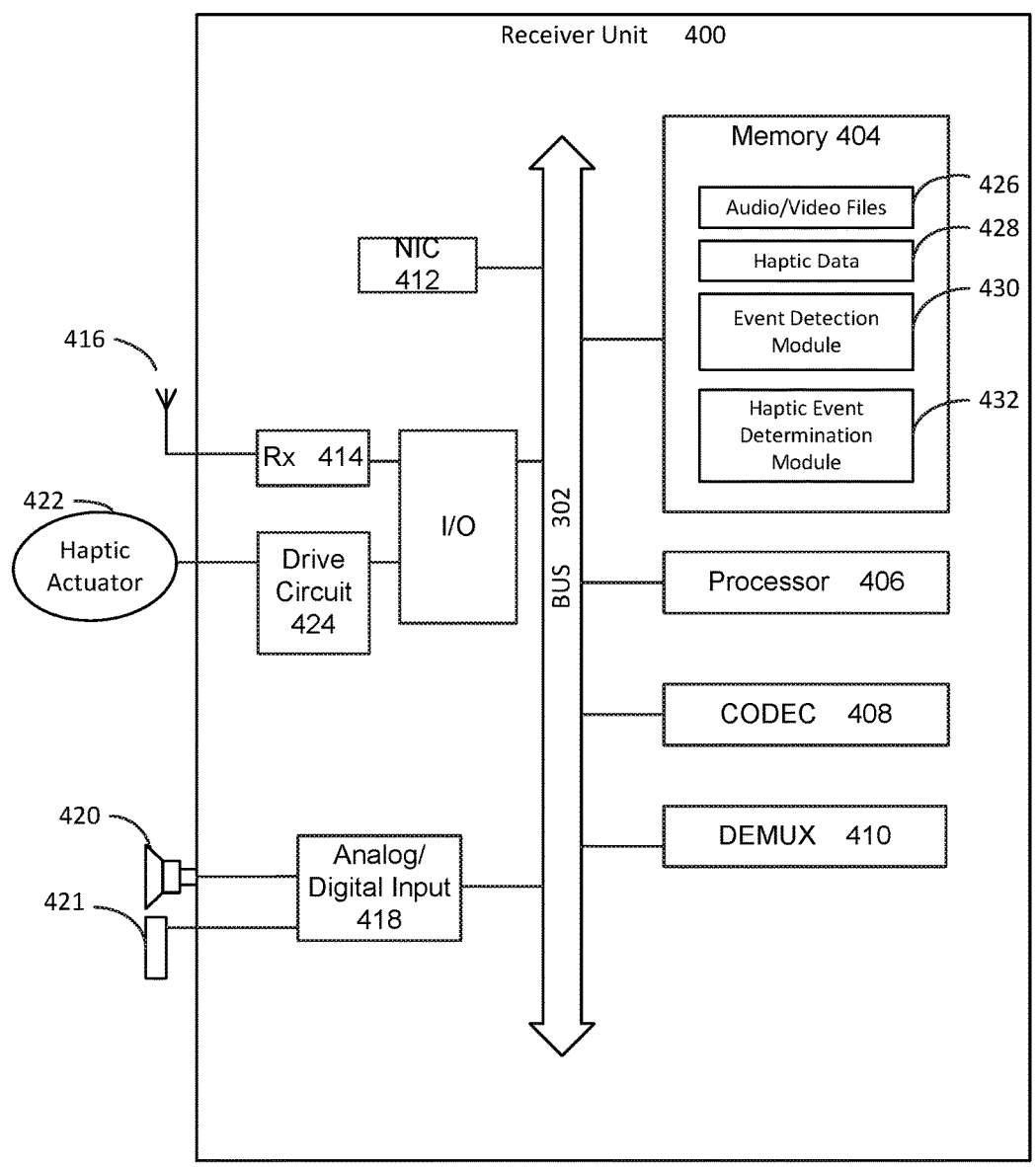
FIG. 4 is a schematic of the receiver unit according to various embodiments of this patent document.

FIG. 4 provides still another example embodiment of a receiver unit of a system for public broadcast with haptic effects. The receiver unit 400 of FIG. 4 includes a main transmission path created by bus 402 to which is coupled a memory 404, a processor 406, a coder/decoder (CODEC) 408, a demultiplexer (DEMUX) 410, a network interface card (NIC) 412, a wireless transceiver 414 with antenna 416, an analog and/or digital output interface 418 connectable, for example, to a public message delivery device such as a speaker 420 or video display 421, and a drive circuit 424 to drive a haptic actuator 422.

The memory 404 may comprise non-volatile memory and RAM (random access memory), and is configured to store program instructions and data upon which the processor 406 is configured to execute. The wireless transceiver 414, whose wireless network access is enabled by NIC 412, is configured to receive the transmission from the public broadcast unit 300 of FIG. 3. As noted earlier, the transmission may comprise a multiple channel transmission, see FIG. 1A, where the non-haptic signal is transmitted over a first wireless channel and the haptic signal is transmitted over a second wireless channel, or the transmission may comprises a multiple channel signal, see FIG. 1B, where the non-haptic signal and haptic signal have been multiplexed for singular transmission. In the latter instance, the DEMUX 410 is used to separate the multiplexed transmission into its component parts of public message and haptic instruction. The CODEC 408 is used to decompress a previously compressed transmission.

The received transmission of the public message and the haptic instruction may contain substantially all necessary instructions and data that the processor 406 requires for the receiver unit 400 to broadcast the public message through, for example, the speaker 420 and/or visual display 421, and to cause the haptic effect by driving, with driver circuit 424, the haptic actuator 422. In another example embodiment, the received transmission may include only a public message indicator and a haptic instruction indicator. In this context, the memory 404 preferably includes one or more of audio and/or video files 426, haptic data 428, an event detection module 430, and a haptic event determination module 432; the various files 426 and data 428 may be organized in an appropriate database structure such as, for example, the database 327 of FIG. 3. As such, the public message indicator may point directly to a specific audio or video file 426 to be broadcast or the public message indicator may be used by the event detection module 430 as a trigger input enabling the event detection module 430 to determine the appropriate public message audio, video or text file for broadcast. Similarly, the haptic instruction indicator may point to specific haptic data 428 to enable production of the haptic effect to the public message via the drive circuit 424 and haptic actuator 422. Alternatively, the haptic instruction indicator may be used by the haptic event determination module 432 to determine the appropriate haptic data 428 to enable production of the haptic effect related to the public message via the drive circuit 424 and haptic actuator 422.

As with the public broadcast unit 300, the receiver unit 400 is subject to modification as is appropriate to a specific application or situation. For example, the event detection module 430 or the haptic even determination module 432 may not be necessary if their functions have already been performed by the public broadcast unit 300. In another example, the haptic signal received over the second channel 110 embodies haptic effect data and the event detection module 430 determines whether a haptic signal was received and then generates a haptic control signal embodying the received haptic data. The haptic control signal is communicated to the drive circuit 424. In yet another example, the memory 404 stores one or more sets of haptic data 428.

Upon the receiver 400 receiving a haptic signal over the second channel 110, the haptic event determination module 432 determines haptic data from the stored haptic data 428. The haptic signal received over the second channel 110 can be a trigger for generating a haptic effect. A haptic control signal embodying the determined haptic data is then generated and communicated to the drive circuit 424.

If the receiver unit 400 does utilize the modules 430 or 432, their locations may be remote from the receiver unit 400. Similarly, the audio/video files 426 and haptic data 428 may not be necessary if the information contained in those files/data is present in the transmission from the public broadcast unit 300. Alternatively, the audio/video files 426 and haptic data 428 may be provided at a remote location for wireless or wired access by the receiver unit 400. The CODEC 408 may not be necessary if the transmission received by the receiver unit 400 was not previously compressed. The demultiplexer 410 may not be necessary if the received transmission has not been previously multiplexed. Other variations on the inclusion or omission of the various components of the receiver unit 400 may be utilized without departing from the spirit or scope of this patent document.

Figure 5:
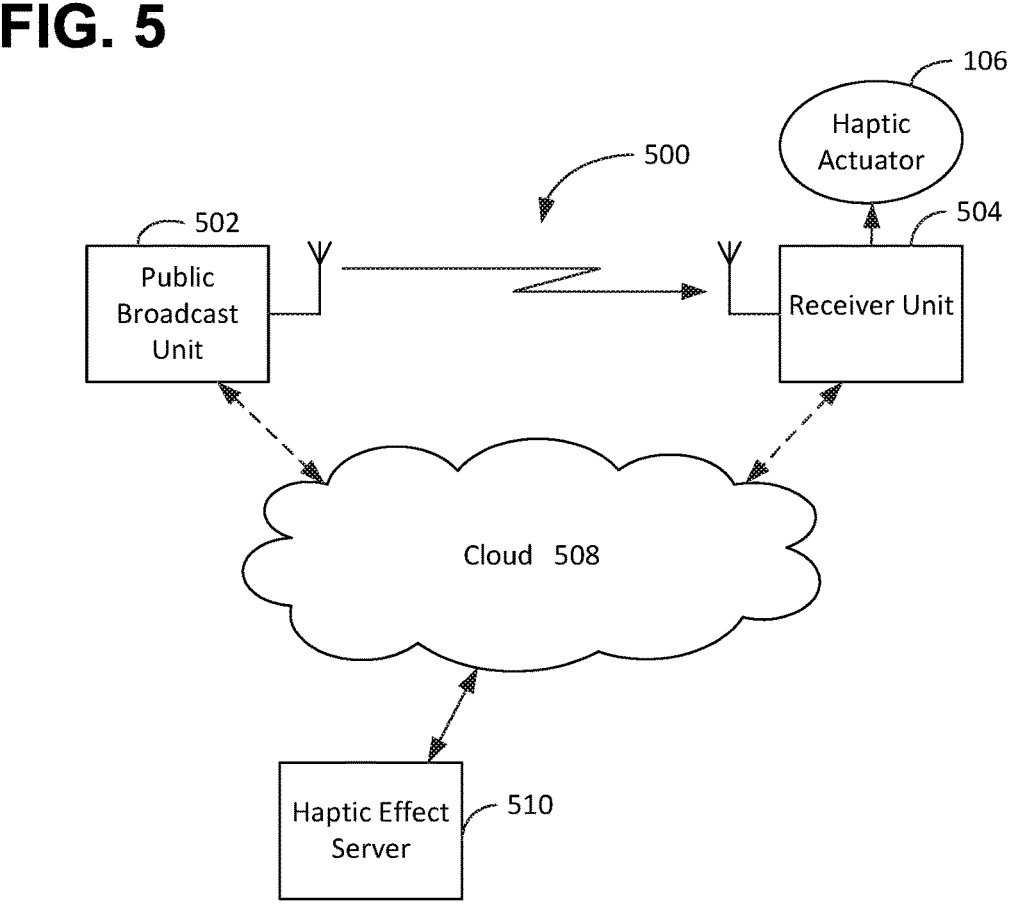
FIG. 5 is a schematic of a system for wireless transmission of public messages with haptic effects incorporating a haptic effects server according to various embodiments of this patent document.

FIG. 5 illustrates another example embodiment of a system 500 for wireless transmission of public messages with haptic effects. In this configuration, a public broadcast unit 502 and/or a receiver unit 504, with a haptic actuator 506, are coupled via the cloud to a haptic effect server 510. The haptic effects server 510 contains a library of instructions, e.g., haptic data, for producing numerous types of different haptic effects at varying intensity levels, e.g., low, medium or high intensity. As such, the haptic effect data may be stored in any or all of three locations: (1) the broadcast unit 502; (2) the receiver unit 504; and (3) the haptic effect server 510, depending on the availability of physical space and/or memory thereby enabling direct, indexed, or referential encoding of the haptic data. The data on the haptic effect server 510 may be accessed by one or both of the public broadcast unit 502 and the receiver unit 504 as necessary to obtain the instruction(s) to produce the desired haptic effect.

The haptic effects server 510 may, alternatively, be configured to include any or all of the audio/video files, haptic data, event detection module, or haptic event determination module as described above with reference to FIGS. 3 and 4, and include a database or other organizational structure. As such, each of audio/video files, haptic data, and modules may be accessed by one or both of the public broadcast unit 502 or the receiver unit 504.

With regard to the embodiments described herein, it should be noted that the receiver unit is housed within or coupled to a publicly available electronic device. A publicly available electronic device includes, for example a portable device, handheld device, toy, gaming console, handheld video game system, gamepad, game controller, desktop computer, portable multifunction device such as a cell phone, smartphone, personal digital assistant (PDA), eReader, portable reading device, handheld reading device, laptop, tablet computer, digital music player, remote control, medical instrument, etc. In other example embodiments, the publicly available electronic device may be embedded in another device such as a vehicle, wrist watch, other jewelry, arm band, gloves, etc. Thus, in certain embodiments, the publicly available electronic device is wearable. In some embodiments, the publicly available electronic device may be embedded in another device, e.g., a vehicle, such as, for example, the console of a car, a car seat, a steering wheel, a gas or brake pedal, etc.

Further, it should be noted that the haptic output device is any component or collection of components that is capable of outputting one or more haptic effects. For example, a haptic output device can be one of various types including, but not limited to, an eccentric rotational mass (ERM) actuator, a linear resonant actuator (LRA), a piezoelectric actuator, a voice coil actuator, an electro-active polymer (EAP) actuator, a memory shape alloy, a pager, a DC motor, an AC motor, a moving magnet actuator, an E-core actuator, a smart gel, an electrostatic actuator, an electrotactile actuator, a deformable surface, an electrostatic friction (ESF) device, an ultrasonic friction (USF) device, or any other haptic output device or collection of components that perform the functions of a haptic output device or that are capable of outputting a haptic effect. Multiple haptic output devices or different-sized haptic output devices may be used to provide a range of vibrational frequencies, which may be actuated individually or simultaneously. Various embodiments may include a single or multiple haptic output devices and may have the same type or a combination of different types of haptic output devices. The drive circuit, utilized if needed to provide the additional current to drive the haptic actuator, is selected appropriate to the type or types of haptic actuators.

Further, it should be noted that some or all of the described components of the receiver unit may actually comprise components that reside within the publicly available electronic device. These components are employed as elements of the receiver unit to produce the public message and haptic effects described above, but are also used to perform the various other functional operations of the publicly available electronic device. Alternatively, the described components of the receiver unit may reside solely within a contained receiver unit component.

Figure 6:
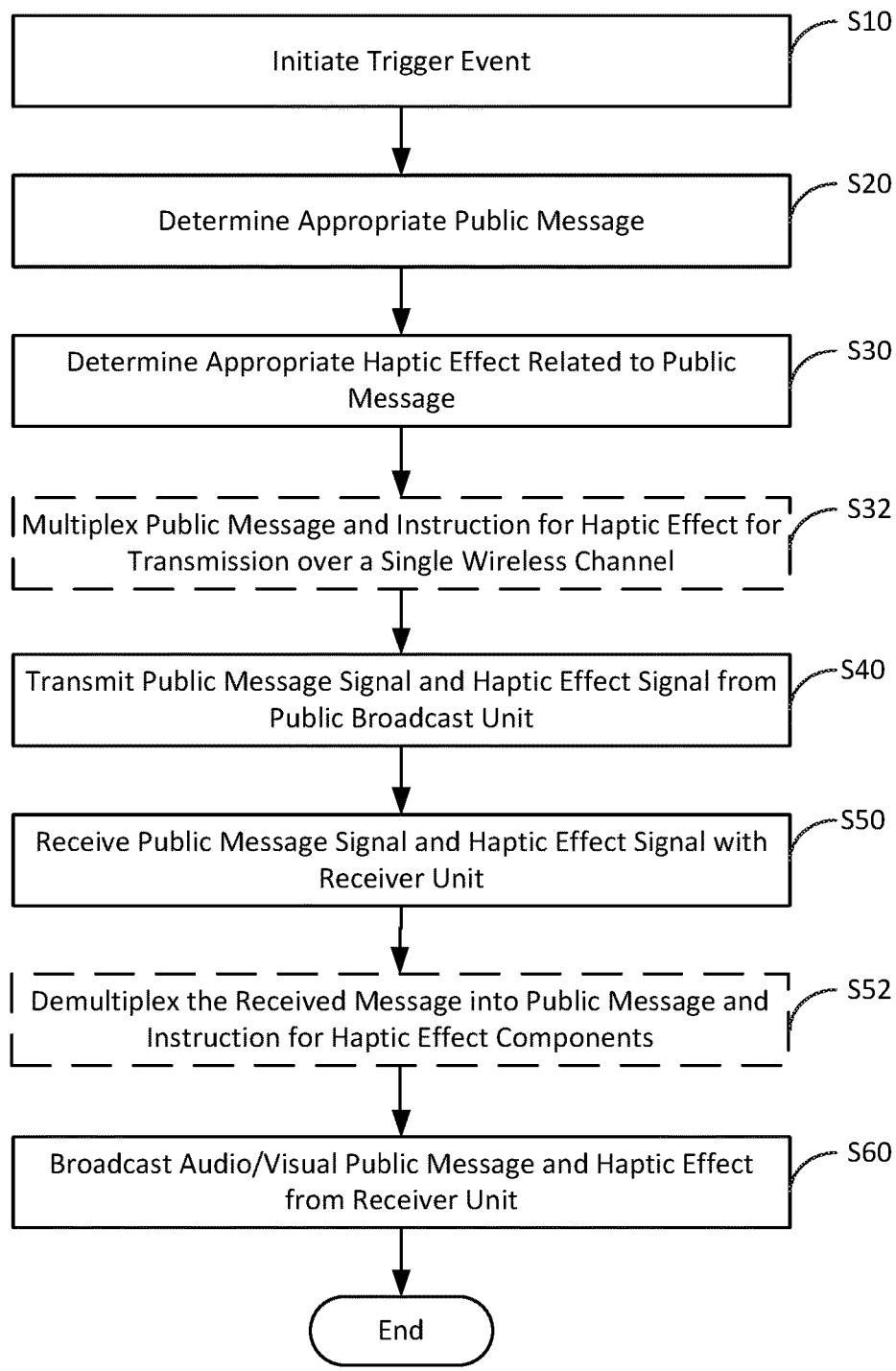
FIG. 6 is a flowchart illustrating the procedure for a public broadcast with haptic effects according to various embodiment of this patent document.

The general procedure 600 to achieve broadcast of a public message with haptic effects is illustrated in the flowchart of FIG. 6. The procedure 600 may be initiated S10 by, for example, a government or non-government source, a private or non-private source, etc., by direct (e.g., push-button trigger event through input interface, power-up of the unit), or remote (e.g., wireless transmission trigger event) activation of the public broadcast unit. In another example embodiment, the broadcast of a public message with haptic effects may be initiated S10 by a device, e.g., a sensor, detecting a condition and reporting that condition as a trigger input event to the public broadcast unit. Other trigger inputs described earlier in the application may also be used.

Once a trigger event has occurred, the public broadcast unit operates in response to the trigger to select S20 a corresponding and/or appropriate public message as well as to select S30 a haptic effect related to the public message. In one example embodiment, the haptic effect is selected such that the public message is more likely be heeded or at least attract additional attention. For example, the intensity and type of haptic event may be varied according to the gravity of the public message, e.g., more important messages are broadcast with more intense and jarring haptic events, less important messages are broadcast with softer feeling, less intense haptic events.

The non-haptic signal and the haptic signal are then transmitted S40 from the public broadcast unit. If the non-haptic signal and the haptic signal are transmitted via a single carrier transmission, the non-haptic signal and haptic signal are multiplexed to separate sub-channel or logical channels S32 prior to transmission.

The separate channels through which the non-haptic signal and haptic signal are transmitted are generally within the radio spectrum of 3 kHz to 300 GHz. However, the frequency at which the non-haptic signal and the haptic signal are transmitted may be more narrowly focused. For example, the non-haptic signal and the haptic signal may be transmitted over frequencies reserved for broadcast by federal, state, national or local governments, agencies, commissions and the like. Alternatively, the non-haptic signal and the haptic signal may be transmitted over privately held, licensed or reserved frequency bands. Some specific examples of transmission frequencies for the non-haptic signal and the haptic signal include the VHF and UHF public service bands, emergency bands, marine bands, weather bands, other public service bands (e.g., traffic, toll information), etc. Still more examples transmissions of the non-haptic signal and the haptic signal include transmissions over the DSRC spectrum (dedicated short range communications; 5850-5925 MHz) used for vehicle-to-vehicle (V2V) and/or vehicle-to-infrastructure (V2I) communication systems and ~915 MHz used by FasTrak for electronic toll collection.

The non-haptic signal and the haptic signal transmission are then received S50 by the receiver unit that is within or coupled to the publicly available electronic device, as described above. If the transmission is a multiplexed transmission, the transmission is demulitplexed S52 to separate out the public message and haptic effect components. The receiver unit then operates to broadcast S60 the public message via an audio or visual display, and elicit the haptic effect by driving the haptic actuator. The haptic effect may occur before, during or after the broadcast of the public message.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. An apparatus for receiving public broadcasts and haptic data comprising:
a receiver having at least first and second public communication channels, wherein the first public channel is configured to receive a wireless transmission of a non-haptic signal including text on the first public communication channel and the second public channel is configured to receive a wireless transmission of a haptic signal including instructions that define a haptic effect on the second public communication channel;
a transducer in electrical communication with the receiver, wherein the transducer is configured to receive and present a public broadcast message through the first public channel; and
a haptic effect actuator in electrical communication with the receiver, wherein the haptic effect actuator is configured to be responsive to the haptic signal to generate a haptic effect;
the haptic signal being related to the public broadcast message.

2. The apparatus of claim 1 wherein:
the receiver is configured to receive the haptic signal having a first frequency and the non-haptic signal having a second frequency.

3. The apparatus of claim 1 wherein:
the receiver is configured to receive a carrier signal, the haptic signal and non-haptic signal being modulated on a carrier frequency.

4. The apparatus of claim 3 wherein:
the receiver is configured to receive a carrier signal, the haptic signal and non-haptic signal being modulated onto the carrier signal and separated by time.

5. The apparatus of claim 1 wherein:
the first channel and second public channels are logical channels embodied in a multiplexed signal carried by the wireless transmission.

6. The apparatus of claim 5 wherein the receiver comprises:
an antenna; and
a demultiplexer in electrical communication between the antenna and the transducer and the haptic effect actuator.

7. The apparatus of claim 6 wherein, the receiver comprises:
memory storing an event detection module programmed to determine whether a haptic signal was received over the second public channel and to generate a haptic control signal embodying haptic data upon the event detection module determining a haptic signal was received over the second public channel; and
a programmable circuit in electrical communication with the memory, the demultiplexer, and the haptic effect actuator.

8. The apparatus of claim 7 further comprising:
a drive circuit in electrical communication between the programmable circuit and the haptic effect actuator.

9. The apparatus of claim 7 wherein:
a haptic effect module is programmed to generate a haptic control signal embodying the haptic data received over the second public channel.

10. The apparatus of claim 7 wherein:
the memory further stores haptic effect data and a haptic event determination module programmed, the haptic event determination module programmed to determine haptic effect data associated with the haptic signal received over the second public channel.

11. The apparatus of claim 7 wherein:
the memory further stores haptic effect data and a haptic event determination module programmed, the haptic event determination module programmed to determine haptic effect data associated with the non-haptic signal received over the first channel.

12. The apparatus of claim 1 further comprising:
a vehicle, the receiver, transducer, and haptic effect actuator being operably connected to the vehicle.

13. An apparatus for transmitting haptic data on a public communication network comprises:
a multiple-channel wireless transmitter; and
a processor communicatively coupled to the multiple-channel wireless transmitter, wherein the processor is configured to operate in response to an input trigger to select a public message including text and haptic data including instructions that define a haptic effect,
wherein the multiple-channel wireless transmitter is configured to transmit the selected public message over a first wireless channel of the multiple channels and is configured to transmit the haptic data over a second wireless channel of the multiple channels, the first and second wireless channels being public channels, the haptic data being related to the public message.

14. The apparatus of claim 13 wherein:
the multiple-channel wireless transmitter is configured to transmit the haptic data as a haptic signal having a first frequency and the non-haptic signal having a second frequency.

15. The apparatus of claim 13 wherein:
the multiple-channel wireless transmitter is configured to transmit a carrier signal, a haptic signal and non-haptic signal being modulated on a carrier frequency.

16. The apparatus of claim 15 wherein:
the multiple-channel wireless transmitter is configured to transmit a carrier signal, the haptic signal and non-haptic signal being modulated onto the carrier signal and separated by time.

17. The apparatus of claim 13 wherein:
the multiple channel wireless transmitter further comprises a multiplexor; and
the first channel and second channel are logical channels embodied in a multiplexed signal carried by the wireless transmitter.

18. The apparatus of claim 13 further comprising:
memory in data communication with the processor, the memory storing at least one public message, at least one set of haptic effect data, and a haptic effect determination module, the haptic effect determination module programmed to determine a set of haptic data upon selection of a public message for transmission over the first wireless channel, the set of haptic effect data being transmitted over the second wireless channel and the public message being transmitted over the first wireless channel.

19. The apparatus of claim 18 wherein:
the memory stores two or more public messages and two or more sets of haptic effect data.

20. The apparatus of claim 13 wherein a server remote from the apparatus comprises server memory storing at least one set of haptic effect data, the apparatus further comprising:
memory storing a haptic effect determination module, the haptic effect determination module programmed to retrieve a set of haptic effect data for transmission over the second wireless channel.

21. The apparatus of claim 20 wherein:
the haptic effect determination module is further programmed to retrieve the set of haptic effect data associated with a public message upon identification of the public message for transmission over the first wireless channel.

22. A method of delivering haptic effect data over a public network, the method comprising:
transmitting a non-haptic signal over a first wireless communication channel, the first wireless communication channel being a public communication channel, the non-haptic signal embodying a public message that includes text; and
transmitting a haptic signal over a second wireless communication channel, the second wireless communication channel being a public communication channel, the haptic signal embodying a set of haptic data that includes instructions that define a haptic effect associated with the public message, the haptic signal being related to the public message.

23. The method of claim 22 further comprising:
multiplexing the non-haptic signal and the haptic signal into a single signal for wireless transmission, the first and second channels being logical channels on the single signal for wireless transmission.

24. The method of claim 22 further comprising:
transmitting the non-haptic signal over a first frequency; and
transmitting the haptic signal over a second frequency.

25. The method of claim 24 further comprising:
modulating the non-haptic signal and the haptic signal onto a carrier signal;
wherein transmitting the non-haptic signal and transmitting the haptic signal comprises transmitting the carrier signal.

26. The method of claim 22 further comprising:
retrieving the set of haptic data for transmission in the haptic signal from memory, the set of haptic data being related to the public message transmitted over the non-haptic signal.

* * * * *